United States Patent [19]
Herndon

[11] 3,895,861
[45] July 22, 1975

[54] REAR-SCREEN WIDE-ANGLE ON-AXIS PROJECTION SYSTEM
[75] Inventor: John W. Herndon, Orlando, Fla.
[73] Assignee: The United States of America as represented by the Secretary of the Navy, Washington, D.C.
[22] Filed: Sept. 13, 1974
[21] Appl. No.: 505,448

[52] U.S. Cl. .................. 352/69; 35/12 N; 352/132
[51] Int. Cl. .......................................... G03b 29/00
[58] Field of Search ... 352/69, 132; 35/12 N, 12 W, 35/12 R, 25, 10.2; 178/6.8

[56] References Cited
UNITED STATES PATENTS
3,205,303  9/1965  Bradley ............................. 35/12 N
3,620,592  11/1971  Freeman ........................... 35/12 N Primary Examiner—Monroe H. Hayes
Attorney, Agent, or Firm—R. S. Sciascia; J. W. Pease

[57] ABSTRACT

A wide-angle on-axis projecting and viewing display system in which the image rays of a wide-angle lens are directed by a reflector means to the rear convex side of a rear projection screen means to be viewed from a point adjacent the front concave side of the screen means, and in which the relative curvatures of the reflector and screen means are selected in relation to each other and to the screen viewing point to cause the image rays to pass through a common point which is the mirror image of the screen viewing point, and hence to provide on-axis viewing of the projected image.

4 Claims, 3 Drawing Figures

REAR-SCREEN WIDE-ANGLE ON-AXIS PROJECTION SYSTEM

CROSS REFERENCE TO RELATED APPLICATIONS

This is an alternative on-axis projection system to applicant's pending application Ser. No. 451,635 filed Mar. 15, 1974.

BACKGROUND OF THE INVENTION

The invention is in the field of optics and is particularly useful in the field of visual aid training simulators.

There is a need in the field of training simulators for wideangle projection systems. Such systems are needed for simulations in such areas as periscope viewing from a submarine, docking of waterborne vehicles, beach landing and retraction of waterborne vehicles, carrier landing for aircraft and a host of other applications. In the past various schemes have been under investigation and some have been implemented which utilize a plurality of projectors to achieve wide-angle display by contiguous smaller displays, the rotation of film or projector to effect a continuous screen and other such efforts. Such systems fall short of a desired result in actual effect and in complexity. Other systems utilize wide angle lenses but are of off-axis arrangement, giving the image an improper perspective from the viewer's position. One system, as described in applicant's co-pending application, provides a wide-angle on-axis system and is an alternative to the present invention.

The subject invention avoids the disadvantages of off-axis type systems and rotating image type systems for the reasons mentioned above. The subject invention provides advantages over applicant's above mentioned co-pending application in applications where size, cost and compatibility with other equipment are of importance.

SUMMARY OF THE INVENTION

In accordance with the subject invention there is provided a reflector means shaped to collect the image light rays from a projector, which could be a television, motion picture or still film, and reflect the rays to a rear-screen projection display means. The configuration of the rear-screen projection display means is in a form, as for example a conical section, such that the reflected rays from the above mentioned reflector means form the image on the rear (outer) surface of the display screen and that the image can be viewed from the center of the curved section. It is further contemplated according to the invention that the relative curvature of the reflector and screen means be selected in relation to the viewer's point such that the viewer's optical paths to the display means are coincident with points on the display means corresponding with the proper azimuth and elevational angles represented by the image.

DESCRIPTION OF THE PREFERRED EMBODIMENT

Figure 1:
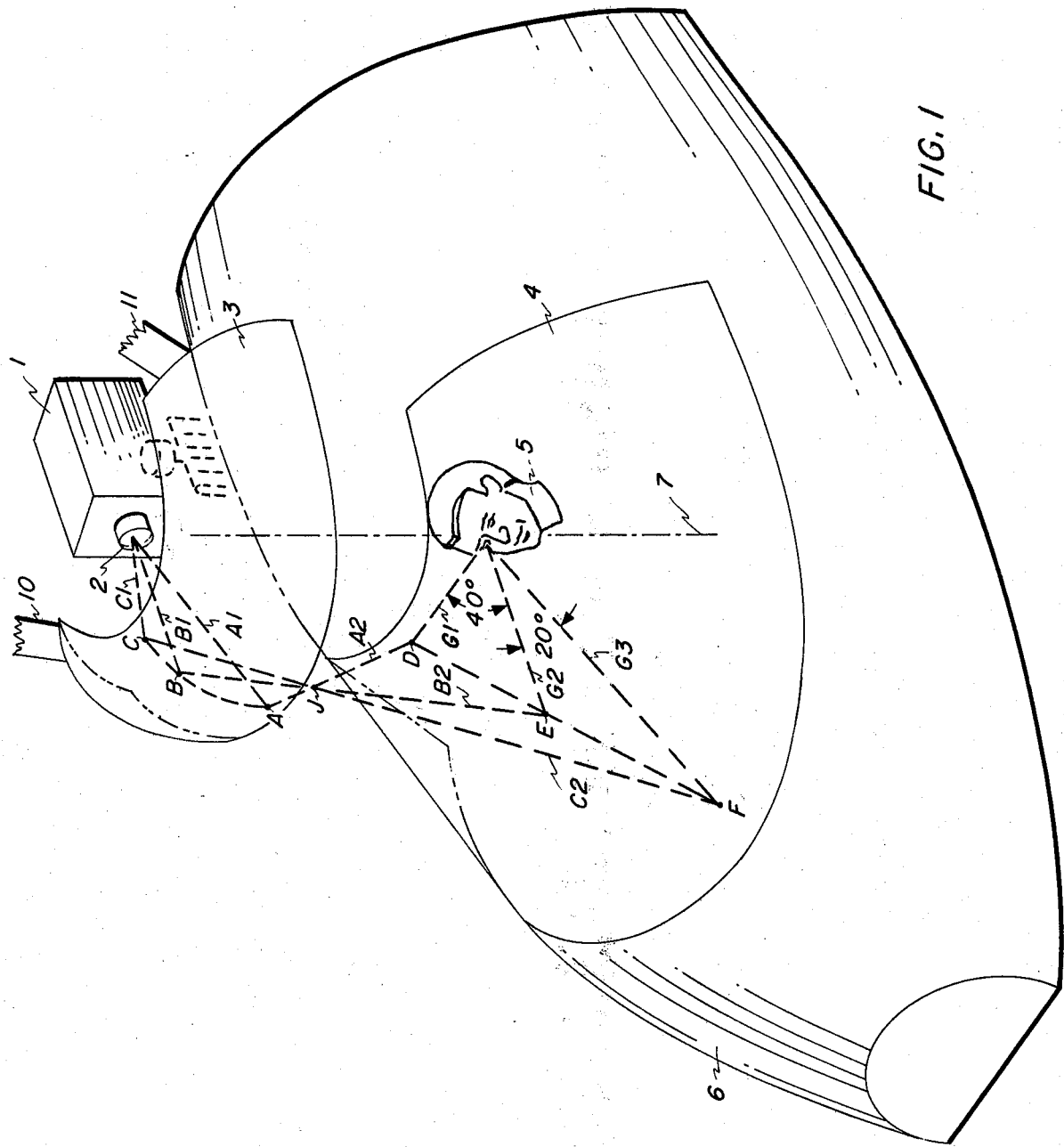
FIG. 1 is a conceptual sketch of apparatus incorporating the invention, as applied by way of example to an aircraft training device, and illustrating the optical and image ray paths in the straight-ahead position.

FIG. 1 illustrates apparatus incorporating the invention and in particular shows in perspective sketch a wide-angle, on-axis projecting and viewing display system as applied to visual simulation of an aircraft trainer. In FIG. 1 a projector 1 is provided to project an image through its wide angle lens 2 to a reflector 3 which is shaped to receive the image rays and redirect the same to a rear-screen projector display means 4. As will be described hereinafter, the relative curvatures of the reflector 3 and screen means 4 are selected in relation to the observer's viewing point G to cause the image rays to pass through a common point J which is the mirror image of the screen viewing point G and hence provides on-axis viewing of the project image. In the example shown in FIG. 1, the display screen means 4 is constructed in the manner of a rear projection screen, but rather than being the usual flat screen, it is shaped in the form of a conical section, the point G being along the vertical axis of said section. In this example, a 45° angle with the vertical is selected for the screen means and its surface is generated through 180° in azimuth. The trainee viewer 5 is seated in the aircraft simulator cockpit 6 so that the viewer's eye-level optical path coincides with a selected level on the display means 4 representing the eye-level view of the projected image. In the same manner the viewer 5 will see all other points on the display means 4 at the proper angles of elevation and azimuth.

In FIG. 1 the image rays, identified as A1, B1 and C1 are in a single vertical plane and projected from lens 2 to the reflector means 3 at an azimuth reading of zero, i.e., dead ahead. Image ray B1 is on the principal axis of the projection system and represents the horizontal plane of view. At point B on reflector means 3, ray B1 is reflected as ray B2 to point E on display means 4. Thus, point E also represents a point on the horizontal plane of the view of the image. The optical path along G2 from the viewing point G to screen point E also represents the horizontal plane of view. The horizontal plane of view, in the example given, is referenced to the aircraft simulator cockpit 6. Thus, if the cockpit 6 is on a motion platform (not shown) the horizontal plane of view may change attitude with respect to the true horizontal plane.

Figure 2:
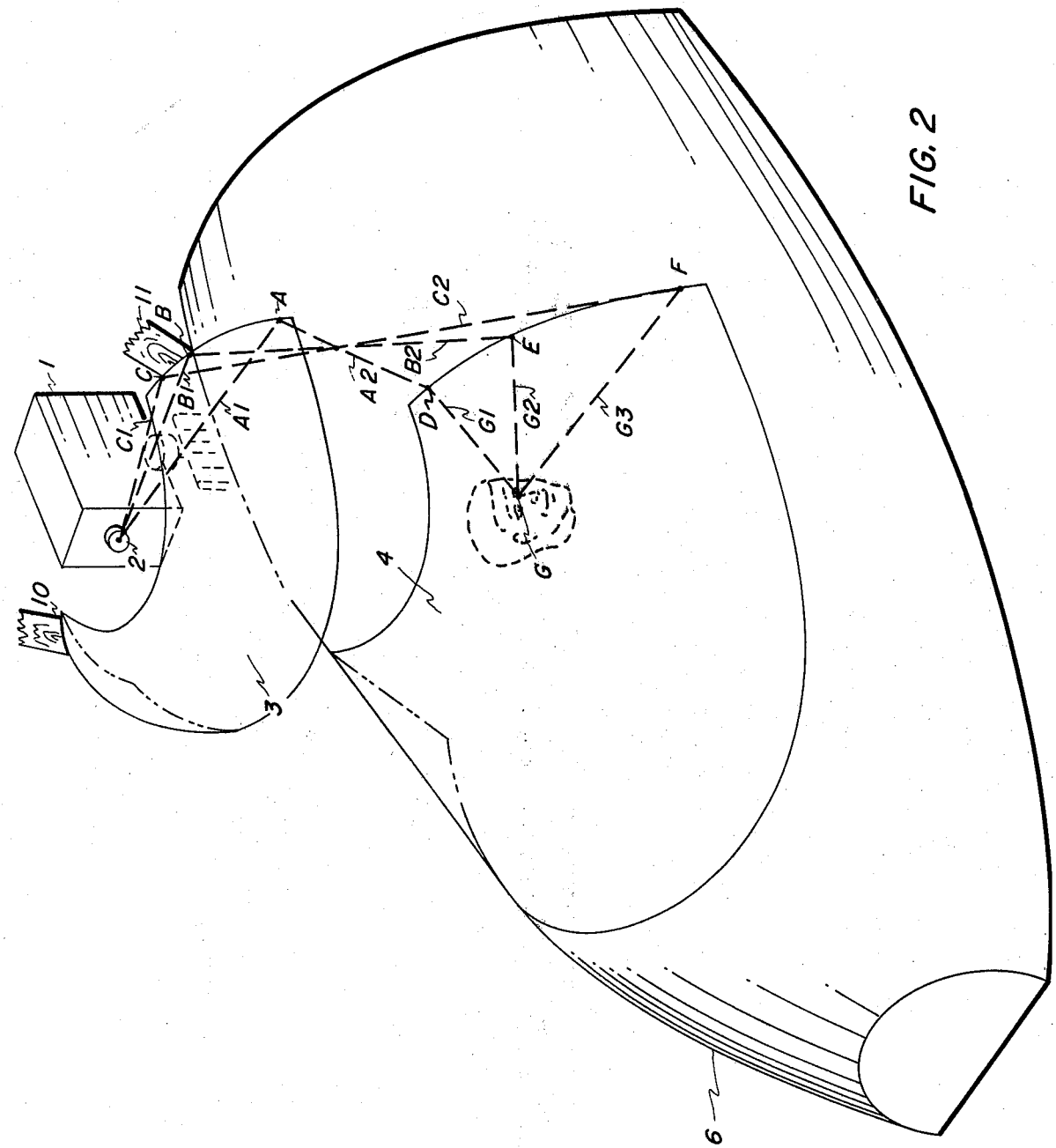
FIG. 2 is a conceptual sketch of the same apparatus, except that the ray paths are illustrated for an aximuth point 90° to the left as viewed from the observation point.

Other image rays above and below the horizontal ray represented by B are represented by the letters A and C. Thus, image rays A1 and C1 will be reflected at points A and C or the reflector means, via A2 and C2 to points D and F respectively on display screen 4. In like manner all rays between those represented by A, B and C will similarly be reflected to their appropriate points on the display screen means 4 as will all rays on other azimuth points than the dead ahead position shown and described. Thus, in FIG. 2 there is shown the same rayarrangement but at ray position in a plane 90° to the left (as viewed from the trainee 5) of the dead ahead azimuth position. The viewer in the case of FIG. 2 must turn his head 90° to the left to see the image at that azimuth. The same numbering and lettering has been used for the rays in FIG. 2 to retain simplicity of the drawing and its explanation.

Referring again to FIGS. 1 and 2, it can be seen that at any azimuth the ray geometry of the system is the same. Thus, when an image is projected through wide-angle lens 2, it substantially fills the wide-angle reflector means 3 and is then reflected to the outer (rear) surface of the rear-screen projection display means 4. The trainee viewer 5 is positioned at the vertical axis 7 of the display means 4, and can view the image over the entire wide-angle area (180° in the example given) of the display means 4. The vertical field of view is determined by the geometry of the reflector means 3 and the display means 4 and in the case of the example is 40° above the system horizontal and 20° below as indicated in FIG. 1.

Figure 3:
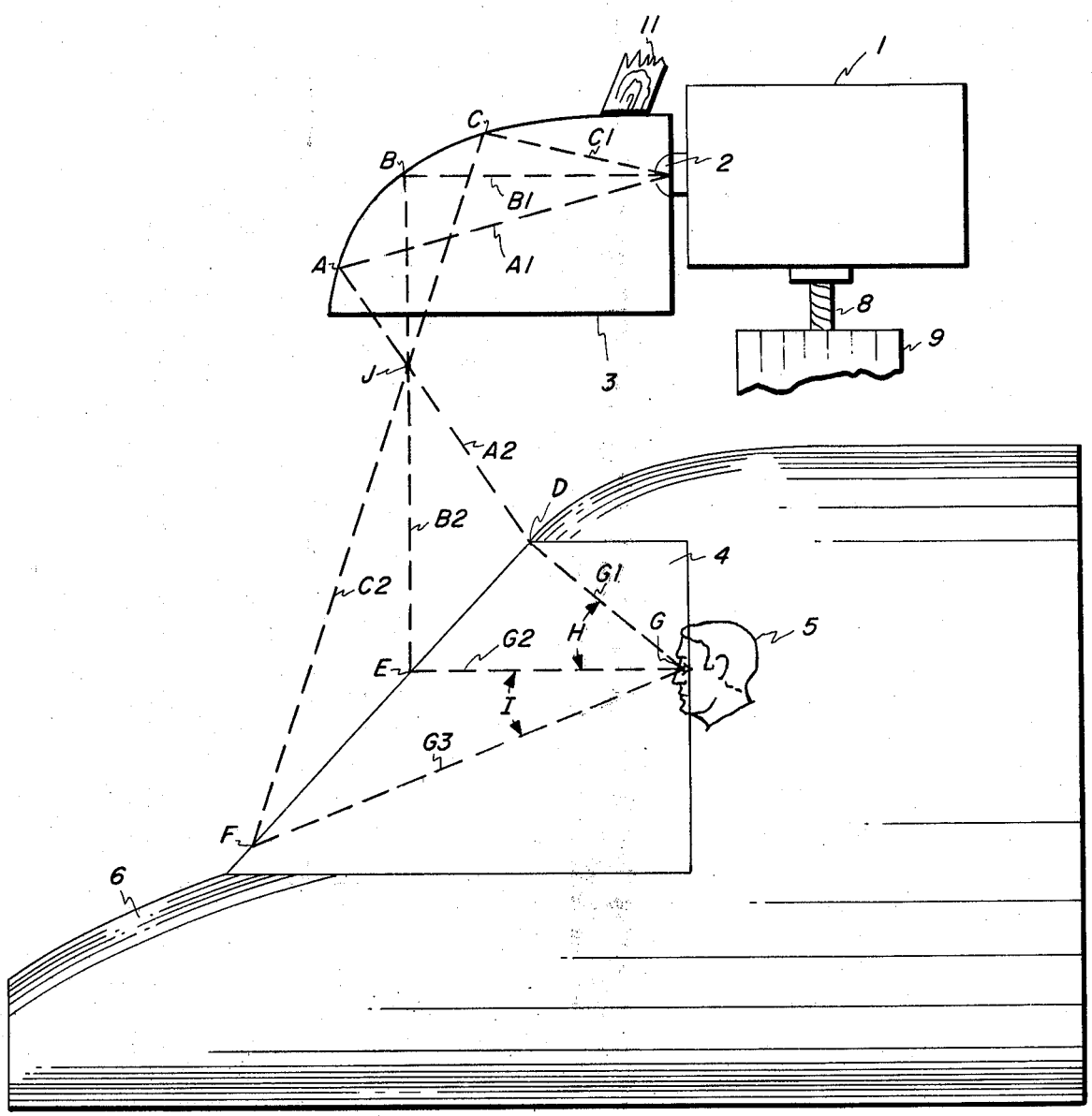
FIG. 3 is a side elevational view of the same apparatus provided as an aid to explanation of the relationships between the elements of the system.

FIG. 3 showing a side elevational view is provided to better illustrate the principle of the system and the relationship of reflector and display means, 3 and 4. In the example shown, the display means 4 is a rear-screen projection surface in the form of a 45° conical section. Point G represents the optical viewing point and angle H defines the vertical field of view above the system horizontal as shown by optic lines G2. Angle I, similarly shows the field of view below the system horizontal. Angles H and I, thus, define the limits of the vertical field of view along lines G1 and G3. Lines G1 and G3 intersect the surface of display means 4 at points D and F respectively, thus defining the vertical limits of image display on the display means 4.

Image ray lines A2, B2 and C2 are geometric images of lines G1, G2 and G3. Thus, the angles which rays A2, B2 and C2 make with the surface of display means 4 are the same as those made by G1, G2 and G3, respectively. Point J, the common point through which rays A2, B2 and C2 pass, therefore, is the image of point G.

Lens 2 is the anamorphic lens with 180° field of view in azimuth and 90° field of view in the vertical. If the camera lens provides a full 180° field of view with an image aspect ratio of three to one, the resulting vertical field of view is 60°. Lens 2 with a 90° vertical field of view will compress the 60° image to 30°. The system, then, as a result of the aforementioned compression allows a much smaller reflector means 3 to be utilized.

Lens 2 is positioned directly above the viewing point G such that the lower limit of the vertical field of view, as defined by line A1, allows line A1 to intersect line A2 at point A, where point A is above common point J. B1 then intercepts line B2 at point B, and line C1 intercepts line C2 at point C. Points A, B and C, as well as all similarly determined points between points A and C, determine the curvature of the vertical profile of reflector means 3. It will be noted that the image from lens 2 must be inverted in order to present an upright image on display means 4. This further allows reflector 3 to present a more compatible profile.

Since trainee may not be at the same eye level even when seated, provision exemplified by screw means 8 fixed to projector 1 and threaded into a fixed member 9 is provided for vertical adjustment of projector 1 and hence lens 2 to cause the image principal line G2 and point E to adjust to the viewing point G. Elements 10 and 11 indicates brackets for holding reflector 3 in position relative to projector 1 and screen 4.

It is to be understood that various modifications and changes can be made without departing from the true spirit and scope of the invention as defined by the attached claims. For example, while the conical section for the screen means is the most practical from a manufacturing point of view, should a particular trainer require a different shape such shape can be used by generating a suitable companion reflector shape from the plurality of reflector points as represented in example by points A, B and C.

What is claimed is:

1. A wide-angle on-axis projecting and viewing display system comprising:
   a. a rear projection display screen having a rear convex side and front concave side,
   b. projector means having a wide-angle lens for projecting image light rays,
   c. a reflector means for receiving and redirecting said rays to the rear side of said rear projection screen for image observation from a viewing point in spaced relation from and on said front side of said screen,
   d. the relative curvatures of said reflector and screen means being selected in relation to each other and to said screen viewing point to cause the image rays to pass through a common point which is the mirror image of said screen viewing point and hence provide on-axis viewing of the projected image.

2. Apparatus according to claim 1 in which
   a. said rear-screen display means is a conical section.

3. Apparatus according to claim 1 including
   a. a fixed support and height adjusting means connected to said projector and said support for varying the height of said image on said display means to match the eye level of a particular trainee when positioned to use said apparatus.

4. Apparatus according to claim 3 in which
   a. said rear-screen display means is a conical section and said projector lens is positioned on a vertical axis from which said cone section is generated.

* * * * *